(No Model.)
G. W. McNEAR.
CAR CONSTRUCTION.
No. 495,261. Patented Apr. 11, 1893.
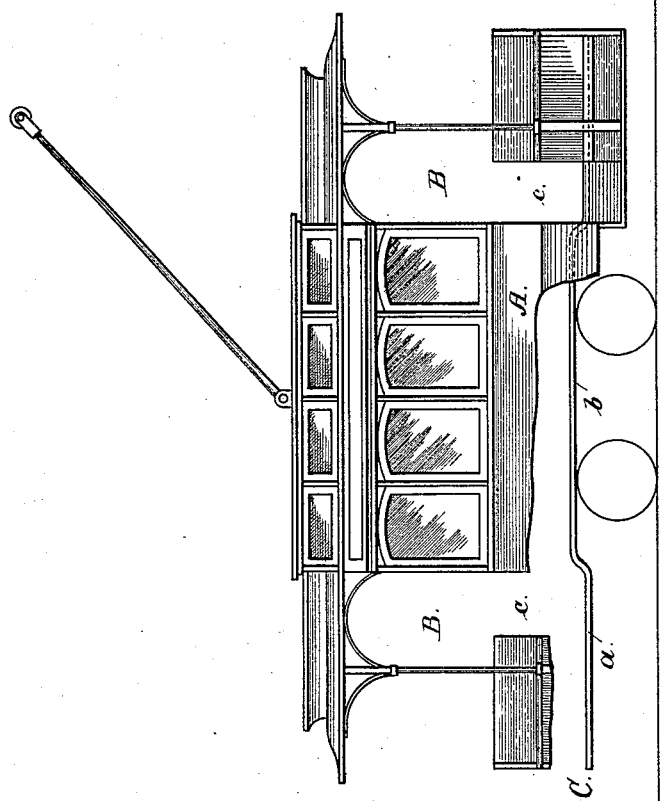
Witnesses:
Wm Mayer
E. J. Gladden
Inventor:
G. W. McNear
by Spear & Seely
Attorneys

UNITED STATES PATENT OFFICE.

GEORGE W. McNEAR, OF OAKLAND, CALIFORNIA.

CAR CONSTRUCTION.

SPECIFICATION forming part of Letters Patent No. 495,261, dated April 11, 1893.

Application filed December 7, 1891. Serial No. 414,231. (No model.)

*To all whom it may concern:*

Be it known that I, GEORGE W. McNEAR, a citizen of the United States, residing at Oakland, in the county of Alameda and State of California, have invented certain new and useful Improvements in Car Construction; and I do hereby declare that the following is a full, clear, and exact description thereof.

This invention relates to improvements in the construction of railway cars intended more particularly for use upon electric railways.

In a patent granted to me November 10, 1891, and numbered 463,071, I described a car of the combination pattern, composed of a central closed compartment, and two open end compartments, having transverse side entrances for passengers, the car running upon two swiveled bogie trucks. I explained, in that patent, that the use of motors and driving gearing, compelled the use of larger wheels, than are required in ordinary cable cars, and that consequently the flooring of the car, if made level throughout, would be brought so high above the step or footboard as to make the transverse entrance passages difficult of access. In that patent, I also described means for overcoming this difficulty, by which the flooring of the central compartment and of the entrances, was brought below that of the end compartments the latter being above the trucks. The construction described in my patent is perfectly adapted to cars running two trucks; but in the case of cars having a single four wheeled truck, with closed and open compartments, and transverse entrances adjacent to the closed compartment, the difficulty still exists; because, the floor above the single truck, if continued upon the same level to the ends of the car would be too high above the footboard at the entrances.

The object of the present invention, therefore, is to provide means whereby a car of the single truck class, and constructed as above described, may be rendered easy of access to passengers.

The invention is illustrated in the accompanying drawing which is a side elevation of a car partly broken away to show my improvements.

The car illustrated, while supposed to be intended for use upon electric railways, is not represented as provided with any electrical motive apparatus, nor with any particular construction of truck, as these form no part of my invention.

The car is about the length of the ordinary single-truck horse car, and is composed of a central closed compartment A, and two short open compartments B, having seats, as shown, and transverse entrance passages c, accessible by means of a footboard. The car is supported by a single four wheeled truck, the wheels being large enough to afford room for the motive and such driving gearing as is required.

C represents one of the longitudinal sills or beams which extend throughout the length of the car and form the supports for its frame work. These sills are usually of steel rolled into U or I cross section; and, as shown in the drawing, are formed with depressed ends $a$ and an elevated immediate portion $b$ the latter being above the truck, so as to give a good clearance for the wheels. The depression of the ends of the sills, permits the flooring of the entrance passages to be brought down to a convenient height above the footboard, making such passages readily accessible.

Practical operation of cars built in accordance with this invention, has demonstrated its convenience and utility for cars of this type; and its advantages appear so obvious as to require no detailed description.

What I claim is—

In a car having a single truck, a longitudinal sill or beam having an elevated middle portion and depressed ends, substantially as set forth.

In testimony whereof I affix my signature, in presence of two witnesses, this 18th day of November, 1891.

GEORGE W. McNEAR.

Witnesses:
L. W. SEELY,
M. R. BRYAN.